United States Patent [19]
Erdelitsch et al.

[11] Patent Number: 4,882,457
[45] Date of Patent: Nov. 21, 1989

[54] STEERING COLUMN SWITCH WITH INDIRECTLY GUIDED BRIDGING CONTACTS

[75] Inventors: Herbert Erdelitsch; Otto Machalitzky; Horst Rachner, all of Bietigheim-Bissingen, Fed. Rep. of Germany

[73] Assignee: SWF Auto-Electric GmbH, Bietigheim-Bissingen, Fed. Rep. of Germany

[21] Appl. No.: 208,358

[22] PCT Filed: Jul. 29, 1987

[86] PCT No.: PCT/EP87/00408
§ 371 Date: May 7, 1988
§ 102(e) Date: May 7, 1988

[87] PCT Pub. No.: WO88/01097
PCT Pub. Date: Feb. 11, 1988

[30] Foreign Application Priority Data
Aug. 2, 1986 [DE] Fed. Rep. of Germany ....... 3626242

[51] Int. Cl.$^4$ .............................................. H01H 3/16
[52] U.S. Cl. ................. 200/61.54; 200/16 C; 200/61.27
[58] Field of Search ................. 200/61.27, 61.3, 61.31, 200/61.32, 61.34, 61.35, 61.54, 4, 16 C, 331, 332, 339, 252, 61.28, 61.29, 61.33

[56] References Cited
U.S. PATENT DOCUMENTS
3,534,189 10/1970 Wilkinson ........................ 200/61.34

Primary Examiner—A. D. Pellinen
Assistant Examiner—Morris Ginsburg
Attorney, Agent, or Firm—Robert P. Seitter

[57] ABSTRACT

A steering column switch for motor vehicles comprises a switch member guiding the bridging contact and being swivellably located around an axis. The stationary contacts, however, acted upon by this bridging contact are arranged along a straight line and in a plane repsectively in parallel to the axis of rotation of the switch member. The bridging contact is not directly guided by the switch member, but by a switching arm substantially radially swivellable in relation to the switch member so that the bridging contact is movable along a staight line despite the circular movement of the switch member.

12 Claims, 2 Drawing Sheets

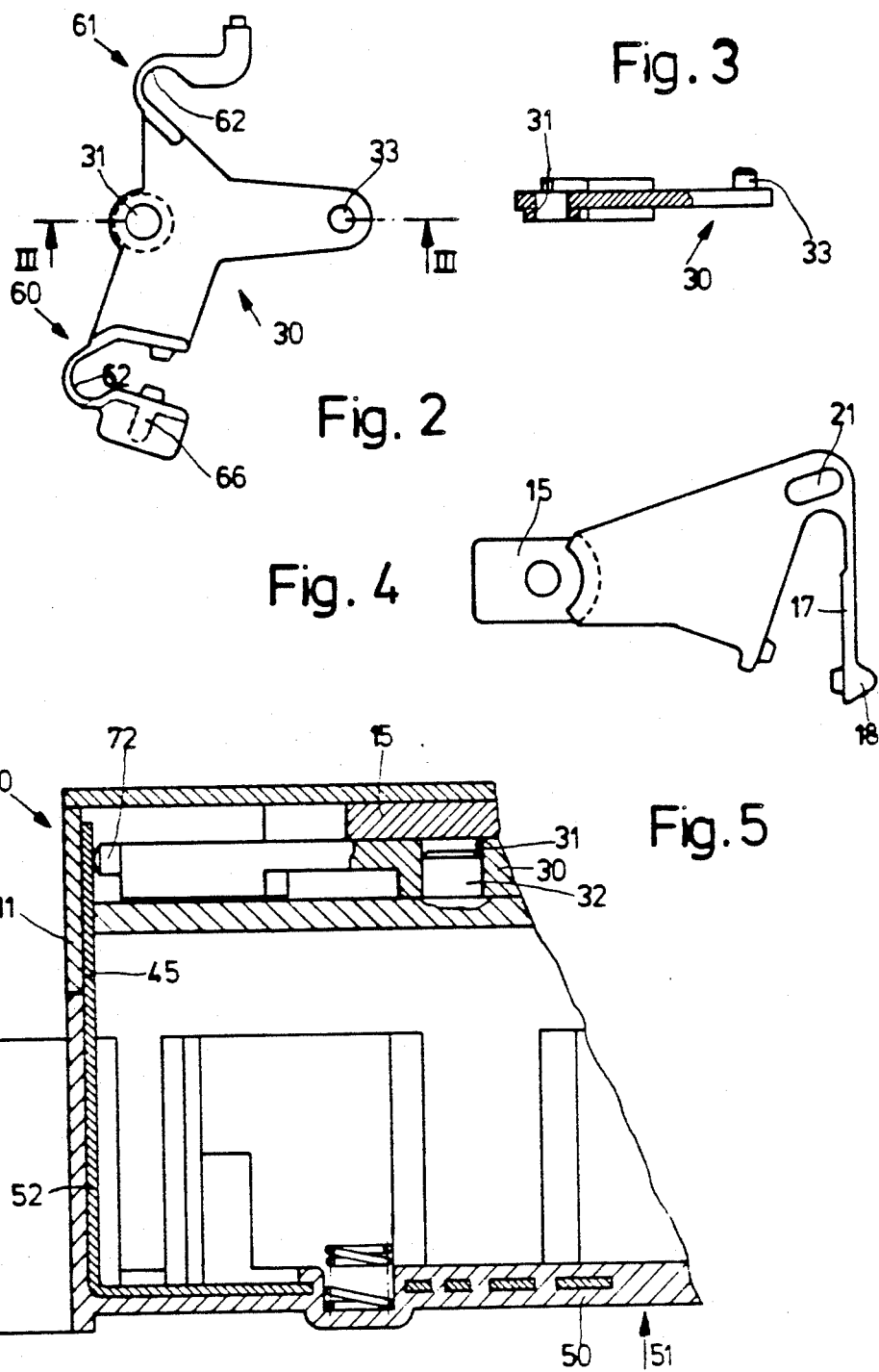

STEERING COLUMN SWITCH WITH INDIRECTLY GUIDED BRIDGING CONTACTS

The invention relates to a switch, especially to a steering column switch for motor vehicles having a rotatable operating lever controlling a bridging contact resiliently urged toward different stationary contacts in different switching positions.

A switch of this kind is known from the German specification DE-GM 7 326 836. In this known embodiment the bridging contact is immediately guided by the swivellable switch member, whereby the bridging contact is to a certain extent radially movable and is pressed against the contact areas of stationary contacts by a pressure spring, which stationary contacts are lying on an orbit around the axis of rotation of the switch member. The pressure spring provides for the necessary contact pressure between the bridging contact and the stationary contacts. In addition, by means of this pressure spring the tolerance is evened out, if the bridging contacts are not exactly arranged on an orbit around the axis of rotation of the switch member. Such compensation of tolerances is only possible to a certain extent because in case of bigger deviations there is danger of canting of the bridging contact in the switch member. So such a construction including a bridging contact immediately guided by the switch member stable in form can only be used, if the path of motion of the bridging contact corresponds to the spatial arrangement of the stationary contacts acted upon by this bridging contact. So if the switch member is swivelled around an axis of rotation, the corresponding stationary contacts should also be positioned on an orbit. If the switch member is moved straight onwards, the stationary contacts must also be arranged along a straight line. This correspondence of the direction of motion of the switch member and of the arrangement of the stationary contacts having been necessary so far requires more time and work as to the construction and production of some switches.

Therefore the object of the invention is to develop a switch of this kind by simplest means in such a way that—to a large extent—the position of the stationary contacts can be fixed regardless of the predetermined direction of motion of the switch member in the switch housing without reducing the contact between the bridging contact and these stationary contacts. In particular, a switch shall be produced that comprises contacts arranged along a straight line, whereas the switch member is still swivellably located around an axis of rotation.

According to the invention this object is achieved by guiding the bridging contact by a switching arm which is so attached to the switch member that it may rotate radially in relation to the switch member.

The present invention is thereby based on the idea that immediate guiding of the bridging contact on the switch member stable in form is not needed. By guiding the switch member—according to the invention—on a switching arm that is substantially radially swivellable in relation to the switch member, the direction of motion of the switch member and the arrangement of the separate stationary contacts can easily be evened out. So the constructor of switches can arrange the stationary contacts in a switch housing regardless of the direction of motion of the switch member according to other criteria, as for instance, according to the space available.

In a preferred embodiment the switching arm itself is springily tensioned in the direction of the contact areas of the stationary contacts. For this purpose an additional pressure spring is used in a first embodiment. The present pressure spring between the switch member and the bridging contact is thereby replaced by this pressure spring between the switch member and the switching arm so that no more time or work is added for this construction in comparison with the known construction. The bridging contact itself can then be guided by the switching arm without any spring support. As to such an embodiment there is no danger of canting between the bridging contact and the guidance on the switching arm.

Principally speaking, the switching arm could radially be guided in the switch member like a slide, however, due to constructive reasons, an embodiment is preferred that comprises a switching arm swivellably attached to the switch member around an axis parallel to the axis of rotation of the switch member. So according to an especially preferred development of the invention the switch member and the switching arm can thus integrally be made of plastics and can be connected via a sort of film hinge. This film hinge ensures the necessary movability of the switching arm, in addition, however, it can be formed in such a way that a spring effect is produced via this film hinge, which spring effect produces a tensioning of the free end of the switching arm in the direction of the contact areas of the stationary contacts. In such a case an additional pressure spring could possibly be renounced on, especially if the bridging contact is formed as a leaf spring comprising deflected projections in traverse direction to its switching direction, which projections are supported on stationary guide stops in parallel to the contact areas. In such an embodiment the contact pressure is generated by an appropriate form and support of the bridging contact itself formed as a leaf spring, whereby the spring effect of the film hinge only fulfills the function of ensuring the connection between the switching arm and this leaf spring.

The basic idea of the present invention can especially advantageously be used, if in a preferred embodiment the stationary contacts are punched out of a metal blank, are bent perpendicular to the metal blank and are arranged in a plane in parallel to the axis of rotation of the switch member, whereby the metal blank is fixed preferably by injection-moulding on a switch base plate perpendicularly located to the axis of rotation of the switch member. In fact, such an embodiment comprising stationary contacts punched out of a metal blank would raise special problems as to the production, if the stationary contacts were arranged on an orbit. Then, after being deflected, the separate stationary contacts would have to be crossed in an additional operational cycle.

The invention and its preferred embodiments are illustrated in the following drawings in which:

FIG. 2 is a view of the switch member,

FIG. 3 is a section of the switch member taken along the line III—III,

FIG. 4 is a view of a locking lever and

FIG. 5 is a partial section of the switch taken along the line V—V in FIG. 1.

Figure 1:
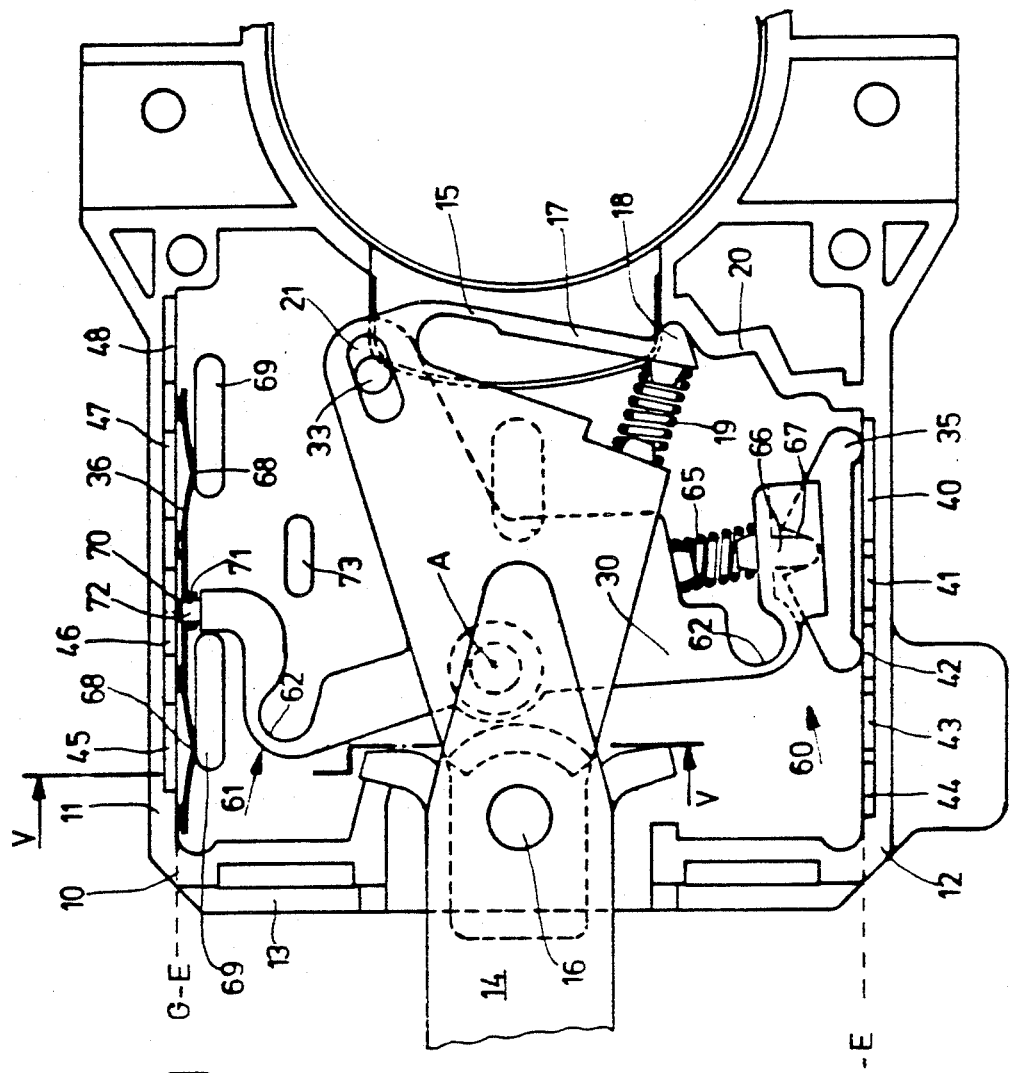
FIG. 1 is a top view of a switch.

The switch comprises a housing top 10 comprising two side walls 11 and 12 positioned in parallel to each other and of a front face 13 from which extends a switch lever 14, only a portion of which is shown in the drawing. A locking lever 15 is form-fittingly connected with this switch lever, which locking lever 15 is swivellably mounted on a pivot pin 16. This switch lever 15 integrally comprises an extension arm 17 with a locking cam 18 which is springily supported by the pressure spring 19 and cooperates with a switch cam 20 as it is generally known. So the switch lever 14, together with the locking lever, can be swivelled into several switching positions. The switch lever 14 and the locking lever 15 could also integrally be formed, however, the embodiment described here is preferred because it is easy to equip a certain type of switch with different switch levers, as it is wanted by some producers of motor vehicles.

Switch member 30 shown in detail in FIGS. 2 and 3 comprises a bearing bore 31 entered by a bearing pin 32. At a certain distance of the bearing bore 31 a carrier pin 33 protrudes from the switch member 30, which carrier pin 33 enters an oblong hole bore 21 of the locking lever 15. So regardless of the switch lever and the locking lever 15 respectively the switch member 30, too, can be swivelled around an axis of rotation A into several switching positions in the switch housing.

Two bridging contacts 35 and 36 are controlled by this switch member 30. The bridging contact 35 cooperates with stationary contacts 40, 41, 42, 43 and 44, which are fixed to the side wall 12 in such a way that their contact areas are positioned along a straight line shown as G in FIG. 1 and are lying in a plane shown as E in FIG. 1 respectively that is located in parallel to the axis of rotation A of the switch member 30. The other bridging contact 36 cooperates with stationary contacts 45, 46, 47 and 48 which are fixed to the other side wall 11 in the same way.

By means of FIG. 5 it shall be indicated that all these stationary contacts are punched out of the same metal blank, which stationary contacts are fixed by extrusion-coating to a base plate 50 of a housing bottom 51. The housing top 10 with the switch in question is put onto the base plate. Conductive strips 52 rectangularly deflected, projecting into the housing top 10 and cooperating there as stationary contacts with the bridging contacts 35 and 36 respectively are punched out of this metal blank.

Especially FIG. 1 makes clear that the contact areas of these stationary contacts are arranged along a straight line and in a plane E respectively, whereas the switch member carrying the bridging contacts is swivellable. So the path of motion of the bridging contact predetermined by the switch member does not correspond to the arrangement of the stationary contacts. However, in the embodiment of the switch according to the invention this fact does not put the contact at a disadvantage because in this case the motion is evened out. For this purpose the switch member 30 has two switching arms 60 and 61 which, together with the switch member 30, are integrally made of plastics. Each switching arm 60, 61 is connected with the fundamental body of the switch member via a sort of film hinge 62, whereby this film hinge 62 is formed in such a way that the free end of each switching arm 60, 61 is swivellably mounted to the switch member 30 around an axis in parallel to the axis of rotation A of said switch member 30. Thus the free end of the switching arm 60, 61 is essentially radially swivellable in relation to the switch member 30.

FIG. 1 shows two different possibilities of guiding and fixing the bridging contacts 35 and 36 respectively on these switching arms 60 and 61 respectively. In ine embodiment the switching arm 60 is supported on a switch member 30 via a pressure spring 65 which nearly acts in a rectangular direction to the contact area plane E of the stationary contacts and which springily tensions the switching arm 60 in direction of the contact areas of the stationary contacts. Next to the free end of the switching arm 60 a web 66 is integrally formed and positioned in parallel to the axis of rotation A of the switch member 30, which web 66 projects into an open recess 67 of the bridging contact 35 formed of a rigid contact metal and which thus serves as a carrier of and as a support for this bridging contact 35. Thus this rigid bridging contact 35 is swivellably hung onto the switching arm, whereby the contact pressure is produced by the additional pressure spring 65 and of course,—to a small extent—also by the spring effect of the film hinge 62.

The other bridging contact 36 is formed as a leaf spring comprising projections 68 deflected perpendicularly with respect to the contact's direction of travel, which projections are supported on stationary guide stops 69 in parallel to the contact area plane E. Thus in this embodiment the contact pressure is produced by a special form and support of the leaf spring-like bridging contact 36 itself, whereby the spring swivellability of the switching arm 61 is more or less only necessary for ensuring the contact between this switching arm and this bridging contact 36. For this purpose between the projections 68 the bridging contact 36 has an aperture 70 with a collar 71 extending at its edge at least in sections, which aperture 70 is entered by a pin 72 with a narrowed cross section extending the switching arm 61. Furthermore a stationary supporting rib 73 is arranged in parallel to and at a distance of the contact area plane E which supporting rib 73 prevents pin 72 and the leaf spring-like bridging contact 36 from being decoupled for at least a certain part of the adjusting movement. In case of swivelling the switch member 30 clockwise the free end of this switching arm 61 is pushed against this supporting rib 73. So even in case of deteriorating elasticity of the film hinge 62 the pin 72 is prevented from sliding out of the aperture of the bridging contact 36.

In short it must be stated that by guiding the bridging contacts on a switching arm being swivellable as to the switching member the circular movement of the switch member and the movement of the contact path located in a plane are evened out, i.e. between the contact points of the bridging contact and the contact points of the stationary contacts, so that even after a longer period of operation a stable contact pressure is ensured. So the constructor is given the possibility of fixing the stationary contacts into the housing wherever he wants. In particular, it is then possible to arrange all stationary contacts along a straight line and to arrange their contact areas in a plane respectively so that no problems will raise even with respect to a switch comprising conductive strips and stationary contacts punched out of a metal blank. In this case the stationary contacts could also be formed as conductive strips on a usual, printed board and could be engaged as a separate component into the switch housing.

Of course, the basic idea of the present invention can also be used for another arrangement of the stationary contacts. In an appropriate construction the stationary contacts could also be located on an orbit whose centre is different from the axis of rotation A of the switch member.

Finally it must be pointed out that due to the chosen arrangement of the stationary contacts 40 to 44 and to the correspondence between their length and that of the bridging contact 35 a circuit provided for a special application with only one bridging contact could be realized as far as the switch illustrated in the drawing is concerned. FIG. 1 shows that the stationary contact 40 is more than twice as long as the other stationary contacts 41 to 44 and that the bridging contact 35 is so long that a stationary contact 41 remains without current in the illustrated off-position between the stationary contacts 40 and 42 acted upon by the bridging contact, whereas two stationary contacts each, namely 41 and 42 or 42 and 43 respectively remain without current in the other switching positions between the stationary contacts 40 and 43 or 41 and 44 respectively acted upon by the bridging contact. The stationary contact 40 is connected with a terminal (not shown). As is is generally known in automotive engineering, the stationary contact 42 is connected with a clamp (not shown). So in the off-position of the switch, a first terminal (not shown) and a second terminal (not shown) are electrically connected. In the following switching position of the switch lever of this signal light switch the stationary contact 40 connected with a clamp (not shown) is joined to the stationary contact 43 connected with a terminal (not shown). This concerns the side lamp of the switch lever. In the third switching position, the main light position, the bridging contact 35 is connected with the stationary contacts 41 and 44 connected with a third and fourth terminal (not shown) respectively.

What is claimed is:

1. An electric steering column switch for motor vehicles comprising a plurality of stationary contacts, a switch lever, a switch member swivellable by said switch lever around an axis of rotation into a plurality of switching positions, said switch member carrying a bridging contact guided by a switching arm and resiliently urged onto contact areas of different ones of said stationary contacts in different switching positions, wherein said switching arm is swivellably attached to the switch member for movement around an axis parallel to the axis of the rotation of the switch member.

2. A switch according to claim 1, further comprising resilient means for tensioning said switching arm in the direction of the contact areas of the stationary contacts.

3. A switch according to claim 2, wherein said resilient means comprises a spring which is clamped between the switching arm and the switch member.

4. A switch according to claim 1, wherein the switch member and the switching arm are integrally made of plastics and are connected via a film hinge.

5. A switch according to claim 4, wherein the film hinge is resilient, the switching arm has a free end, and the resilient film hinge tensions the free end of the switching arm in the direction of the contact areas of the stationary contacts.

6. A switch according to claim 1, wherein said switching arm has a free end and the bridging contact is formed as a rigid contact metal which is swivellably hung onto the free end of the switching arm.

7. A switch according to claim 6, wherein next to the free end of the switching arm a web integrally formed is arranged in parallel to the axis of rotation of the switch member, which web projects into an open recess of the bridging contact and serves as a carrier of and a support for this bridging contact.

8. A switch according to claim 1, wherein the bridging contact is formed as a leaf spring comprising deflected projections which are supported on stationary guide stops in parallel to a contact area plane.

9. A switch according to claim 8, wherein the bridging contact comprises an aperture between the projections and one end of said switching arm comprises a pin fior tightly engaging said aperture.

10. A switch according to claim 9, wherein a collar extends the edge of said aperture for guiding the pin.

11. A switch according to claim 1, further comprising a stationary supporting rib arranged in parallel to the contact area plane wherein said switch member urges said switching arm along a path of travel and said rib prevents for at least a certain part of said path of travel, a pin of the switching arm and the bridging contact from being disengaged.

12. A switch according to claim 1, further comprising a switch base plate and a metal blank attached thereto; wherein:
   said stationary contacts are attached to said metal blank and extend perpendicularly therefrom, said contacts being arranged in a plane in parallel to the axis of rotation of the switch member; and
   said switch base plate is disposed perpendicularly to the axis of rotation of the switch member.

* * * * *